United States Patent
Li et al.

(10) Patent No.: US 8,875,394 B2
(45) Date of Patent: Nov. 4, 2014

(54) SOLAR ENERGY COLLECTING MODULES AND METHOD FOR ASSEMBLING THE SAME

(75) Inventors: Szu-Han Li, Zhongli (TW); Thomas Tong Hong Fu, Taichung (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 610 days.

(21) Appl. No.: 13/186,097

(22) Filed: Jul. 19, 2011

(65) Prior Publication Data

US 2013/0019857 A1  Jan. 24, 2013

(51) Int. Cl.
*B21D 53/06* (2006.01)
*H01L 31/042* (2014.01)
*F24J 2/52* (2006.01)

(52) U.S. Cl.
CPC ............ *H01L 31/0424* (2013.01); *Y02E 10/50* (2013.01); *Y02E 10/47* (2013.01); *F24J 2/5211* (2013.01)
USPC .................................. 29/890.033; 29/525.01

(58) Field of Classification Search
CPC ......... B23P 15/26; B21J 15/14; B21J 15/142; Y02E 10/44
USPC .................... 29/890.033, 428, 462, 464, 466, 29/525.01, 525.02, 525.03, 525.04, 29/525.08, 525.09
See application file for complete search history.

(56) References Cited

U.S. PATENT DOCUMENTS

| 2010/0218810 | A1 | 9/2010 | Suganuma et al. |
| 2011/0000524 | A1 | 1/2011 | Busch et al. |
| 2011/0041890 | A1 | 2/2011 | Sheats |
| 2011/0047931 | A1 | 3/2011 | Wallgren |

FOREIGN PATENT DOCUMENTS

| EP | 2234173 A2 | 9/2010 |
| EP | 2228829 A3 | 10/2010 |

OTHER PUBLICATIONS

Official Action issued by the German Patent Office on Jul. 1, 2013 in counterpart German Patent Application.

*Primary Examiner* — Ryan J Walters
(74) *Attorney, Agent, or Firm* — Duane Morris LLP

(57) ABSTRACT

A solar energy collecting module includes a frame that is assembled without using screws. The peripheral frame components are joined together using locking links and one or more ribs extend along the back side of the solar panel and are coupled to opposed sides of the frame. The ribs are coupled to the frames by an edge key fastener that includes opposed first flanges and opposed second flanges, the first flanges separated from the second flanges by a gap. The edge key fastener is inserted into an opening formed in a side wall of a frame component and rotated such that the opposed first flanges are disposed behind the side wall and within the frame and the opposed second flanges are received in a corresponding cavity formed in each of opposed ends of the rib.

19 Claims, 5 Drawing Sheets

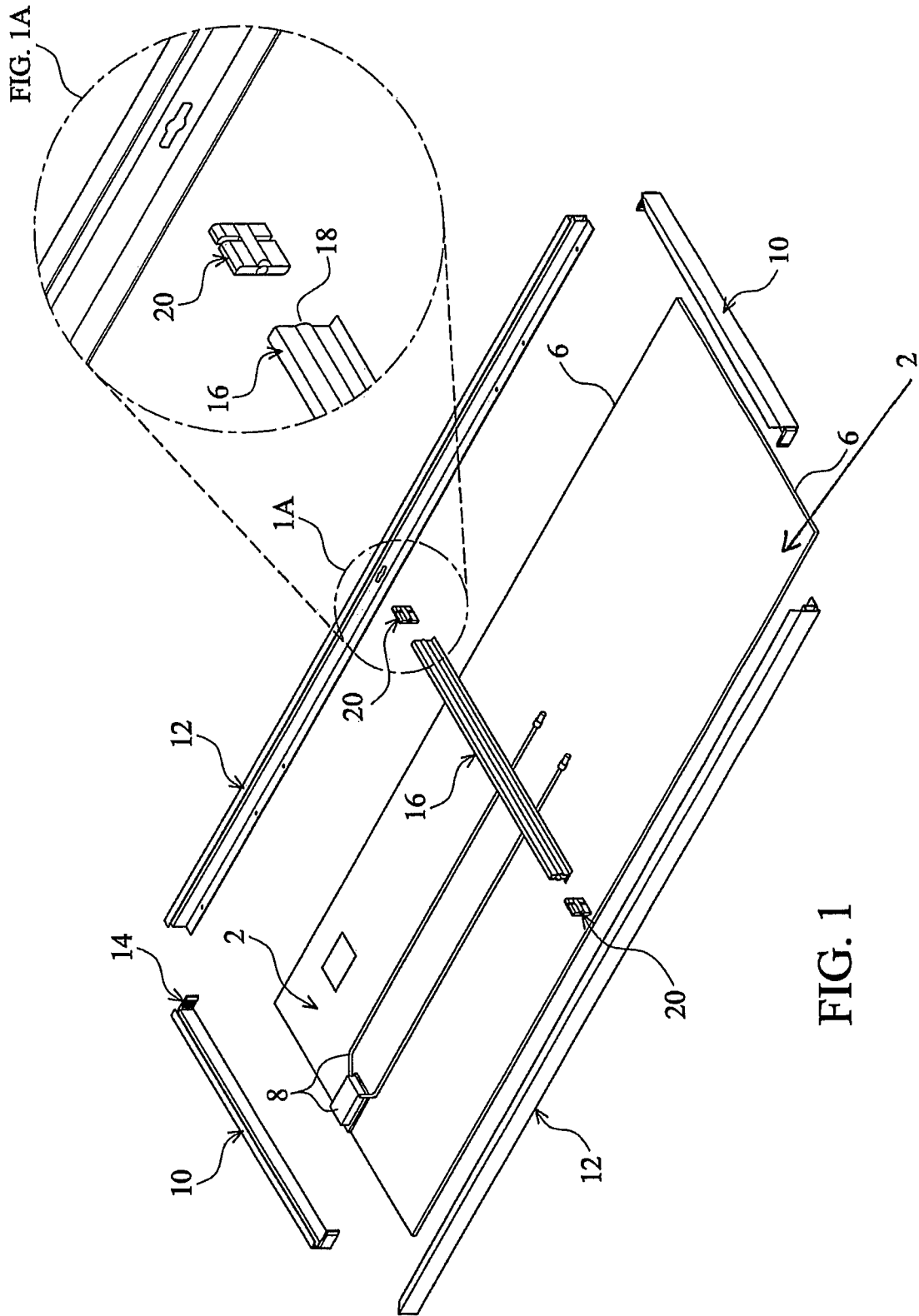

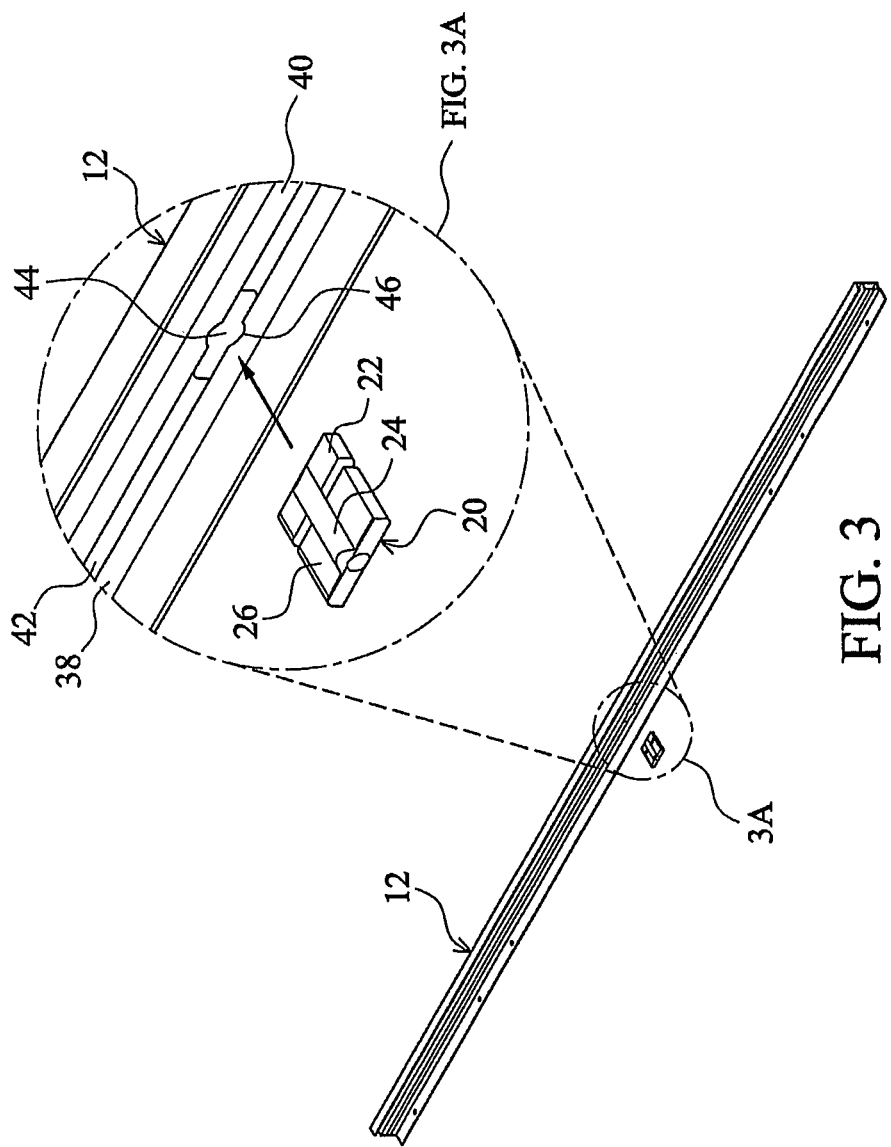

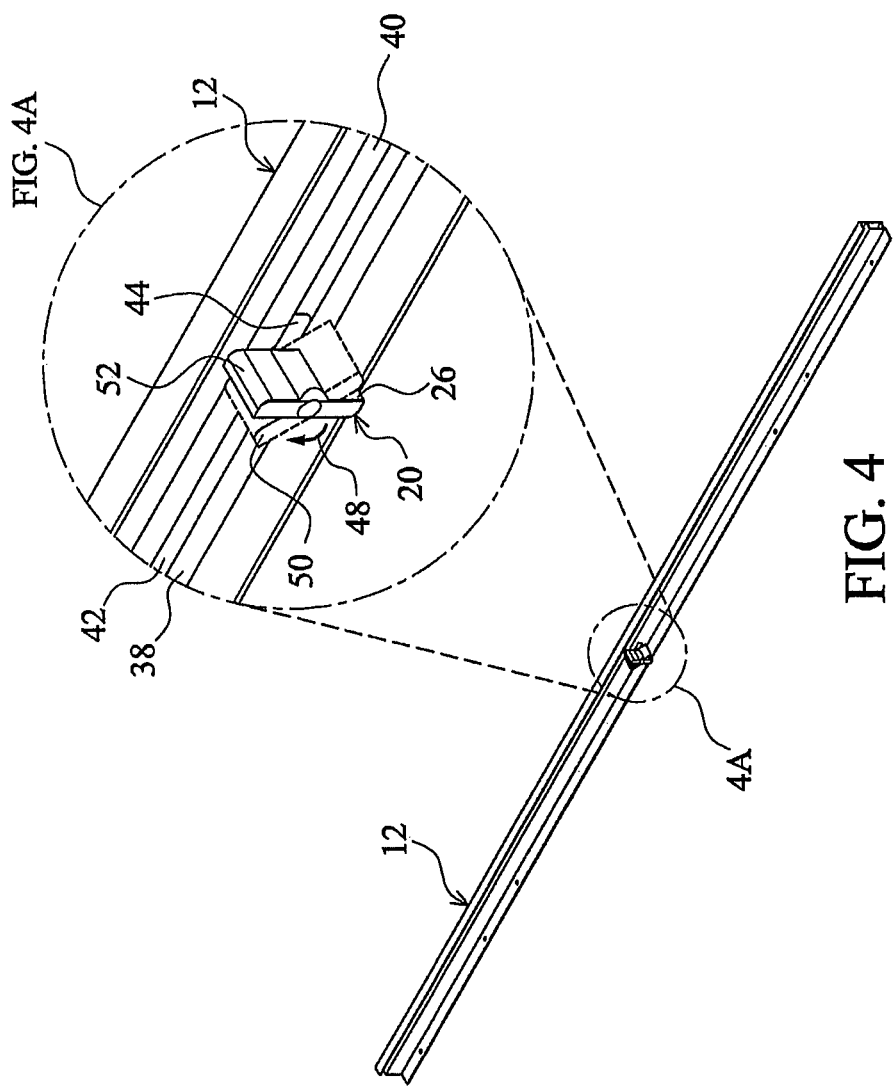

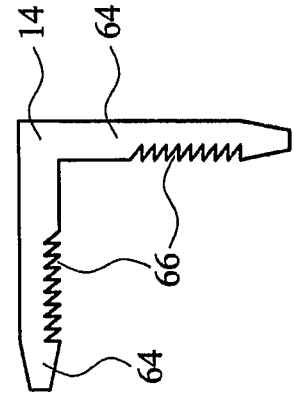
FIG. 5C
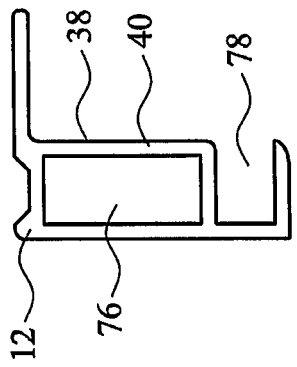
FIG. 5E
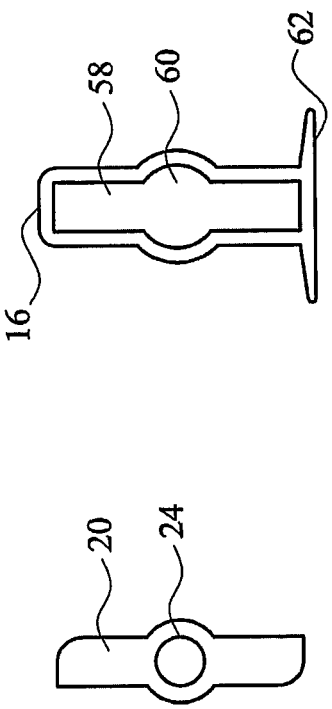
FIG. 5B
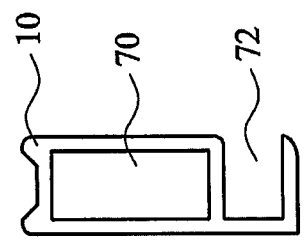
FIG. 5A
FIG. 5D

SOLAR ENERGY COLLECTING MODULES AND METHOD FOR ASSEMBLING THE SAME

TECHNICAL FIELD

The disclosure relates to a solar energy collecting module including a frame and methods for assembling the same.

BACKGROUND

Solar cells are photovoltaic components for direct generation of electrical current from sunlight. Due to the growing demand for clean sources of energy, the manufacture of solar cells has expanded dramatically in recent years.

A variety of solar energy collecting modules currently exists. One such module includes a photovoltaic panel that receives solar energy and converts the solar energy directly into electricity. Another such module includes a solar thermal collecting panel which harnesses solar energy for heat. The solar energy collecting modules can have different geometries, but are commonly made with a generally flat construction. Photovoltaic panels, i.e. solar panels, are often electrically connected in multiples as solar photovoltaic arrays to convert a large amount of solar energy into electricity. In operation, photons from sunlight knock electrons into a higher state of energy, creating electricity. The solar panels that produce direct current electricity from light require protection from the environment and are usually packaged behind a glass sheet.

One limitation in the growth of solar energy is the assembly and installation costs for the solar or photovoltaic panels. The material costs for the frame and other components used to assemble the solar panel into a solar energy collecting module, are significant. An increase to the cost of the system negatively impacts the financial advantage that consumers expect from a solar energy solution.

Solar energy collecting modules are generally in the form of an assembly that includes the solar energy collecting panel retained within a sturdy frame which prevents damage to the solar energy collecting panel. Conventional methods for assembling the frames and installing the panels include fastening the components of the frame together using time consuming assembly and installation processes that may require tightening components to one another in a prescribed manner and to a particular degree. Conventional solar energy collecting modules may include fastening components that are exposed and visible from outside the frame, detracting from the appearance of the module and which may present corrosion issues due to galvanic mismatching. Conventional frames may also undesirably require bulky frame components to accommodate the fasteners used to join the frame components. Bulkier, heavier frame components are therefore more costly frame components since the cost of the frame is dependent upon the amount of the material used to construct the frame.

The present disclosure addresses these and other shortcomings.

BRIEF DESCRIPTION OF THE DRAWING

The present disclosure is best understood from the following detailed description when read in conjunction with the accompanying drawing. It is emphasized that, according to common practice, the various features of the drawing are not necessarily to scale. On the contrary, the dimensions of the various features may be arbitrarily expanded or reduced for clarity. Like numerals denote like features throughout the specification and drawing.

FIG. 1 is an exploded perspective view of a solar energy collecting module according to the disclosure and FIG. 1A is an expanded view of a portion of FIG. 1;

FIG. 3 is a perspective view showing an exemplary edge key fastener of the disclosure positioned for assembly and FIG. 3A shows an expanded view of a portion of FIG. 3;

FIG. 4 is a perspective view showing an exemplary edge key fastener being inserted into an exemplary side rail and FIG. 4A is an expanded view of a portion of FIG. 4; and FIGS. 5A-5E show cross-sectional of views of exemplary components of the disclosed solar energy collecting module.

DETAILED DESCRIPTION

Figure 2B:
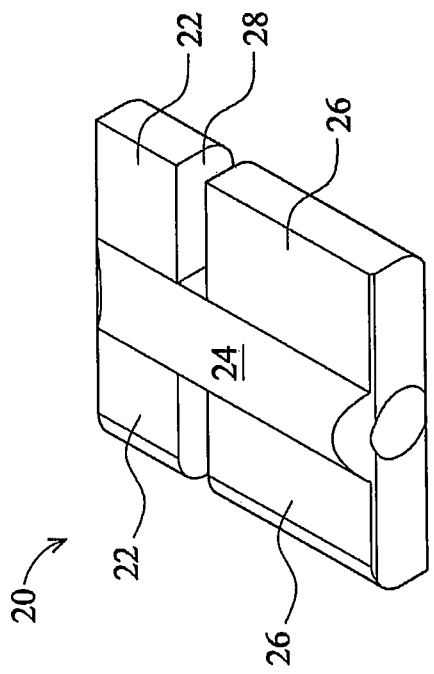
FIGS. 2A-2D show various views of an exemplary edge key fastener according to the disclosure.

FIG. 1 is an exploded perspective view of an unassembled solar energy collecting module according to the disclosure and FIG. 1A is an expanded view of the indicated portion of FIG. 1. Solar energy collecting panel 2 is bounded by peripheral edge 6 and is illustrated with its solar energy collecting side face down. The solar energy collecting side of solar energy collecting panel 2 includes photovoltaic cells capable of converting solar energy directly into electricity and/or heat. The solar energy collecting side is disposed opposite rear side 4, which is illustrated in FIG. 1. Rear side 4 includes electrical components 8 such as a junction box and conductive wires, that harness the electrical or heat energy and provide it to sources capable of using the electricity. The unassembled solar energy collecting module includes opposed end rails 10 and opposed side rails 12. End rails 10 and side rails 12 are to be coupled to one another using locking links 14 which are illustrated having been already coupled to end rails 10. Rib 16 includes opposed ends 18 and edge key fastener 20 is used to couple each of opposed ends 18 of rib 16 to a corresponding frame component, i.e. to side rails 12 in the illustrated embodiment.

According to one exemplary embodiment, each of the frame components including end rails 10, side rails 12, locking links 14, rib 16 and edge key fasteners 20 may be formed of aluminum or other suitable materials. According to another exemplary embodiment, end rails 10, side rails 12 and rib 16 may be formed of aluminum and locking links 14 or edge key fastener 20 or both locking links 14 and edge key fastener 20 may be formed of another material chosen to avoid galvanic corrosion. According to one exemplary embodiment, in which end rails 10, side rails 12 and rib 16 are formed of aluminum, edge key fastener 20 or locking link 14 or both may be formed of a metal material such as stainless steel that is more noble than aluminum, i.e. a metal with a higher standard electrode potential than aluminum's −1.67V. Since the relative area of the anode and cathode has a pronounced effect upon the amount of galvanic corrosion, when a large anode, i.e. the less noble metal such as aluminum, is used in conjunction with a small cathode, various materials that are more noble than aluminum can be used as fasteners such as edge key fasteners 40 and locking links 14. In addition to various stainless steel grades, other steels, tin, copper and other suitable materials may be used for edge key fastener 20, locking links 14, or both of these components.

Figure 2D:
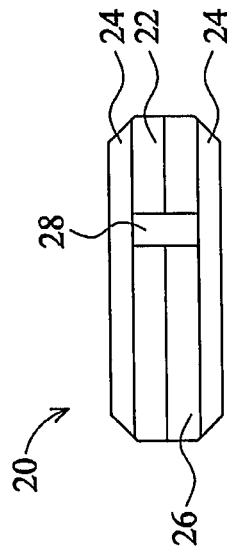
Figure 2A:
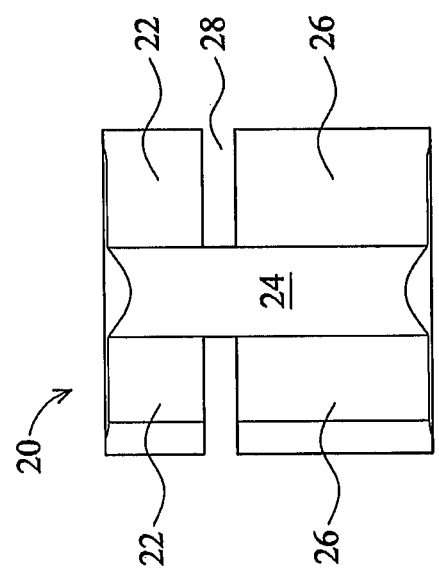
Figure 2C:
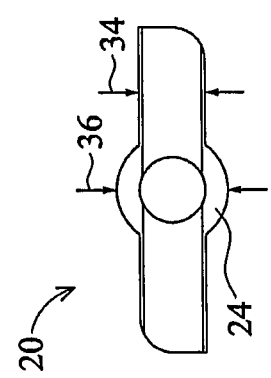

FIGS. 2A-2D show edge key fastener 20 in various views. Edge key fastener 20 includes a set of opposed first flanges 22 and opposed second flanges 26. Interposed between opposed first flanges 22 is shaft 24 which is also interposed between opposed second flanges 26. Opposed first flanges 22 are spaced from opposed second flanges 26 by gap 28. According to the illustrated exemplary embodiment, each of opposed first flanges 22 and opposed second flanges 26 are flat and have the same thickness 34 which is less than diameter 36 of shaft 24. Edge key fastener 20 may be formed to various dimensions and is not intended to be limited to the relative sizes or orientation of the various components illustrated. The relative sizes and orientation of the various components of edge key fastener 20 are exemplary only. In other exemplary embodiments, opposed first flanges 22 may include a different thickness than second flanges 26, or opposed first flanges 22 may themselves be mismatched in thickness, or the opposed flanges may not be aligned parallel to one another as in the illustrated embodiment.

FIGS. 3 and 3A show edge key fastener 20 positioned for being joined to side rail 12. FIG. 3A clearly illustrates edge key fastener 20 aligned with opening 44 formed in wall 40 of side rail 12. Wall 40 includes inwardly disposed surface 38. Opening 44 is an elongate opening with a bulbous central portion 46 and it is aligned along strip 42 in the exemplary embodiment. According to other exemplary embodiments, strip 42 may represent an opening that extends longitudinally down side rails 12 and includes a spacing slightly greater than diameter 36 of shaft 24 such that edge key fastener 20 including shaft 24 can be inserted through this longitudinal opening and then rotated such that first flanges 22 are disposed and secured behind wall 40, essentially inside side rail 12.

Wall 40 is dimensioned in conjunction with edge key fastener 20 and in one advantageous embodiment, wall 40 includes a thickness that is about the same dimension as gap 28.

FIGS. 4 and 4A show the insertion of edge key fastener 20 into side rail 12. Edge key fastener 20 is joined to side rail 12 by inserting opposed first flanges 22, largely obscured in FIGS. 4 and 4A, through opening 44 shown clearly in FIG. 3A and partially in FIG. 4A, then rotating such that opposed first flanges 22 are disposed behind wall 40 of side rail 12. According to various embodiments in which side rail 12 has a hollow central cavity (see FIG. 5E), opposed first flanges are then disposed inside side rail 12. The described installation operation can be accomplished by aligning edge key fastener 20 with opening 44 such as shown in FIG. 3, then inserting edge key fastener 20 through opening 44 and rotating along direction 48 through position 50, indicated by dashed lines, and finally to position 52. In the exemplary embodiment, orientation 52 is substantially perpendicular to elongate opening 44 but this is exemplary only. It will be seen that opposed flanges 26 oriented in position 52 are oriented to be received in one of opposed ends 18 of rib 16.

Shaft 24 of edge key fastener 20 extends through opening 44 and opposed second flanges 26 are positioned outside wall 40, i.e. on the side of wall 40 opposite opposed first flanges 22, i.e. facing surface 38. Wall 40 is received within gap 28 of edge key fastener 20 and according to one advantageous embodiment in which the thickness of wall 40 is about the same as the spacing of gap 28, edge key fastener 20 is securely fastened to side rail 12 once it is rotated into position. Edge key fastener 20 disposed in position 52 is configured to be received in a corresponding cavity in one of the opposed ends 18 of rib 16 such as shown in FIGS. 1 and 1A.

FIGS. 5A-5E show various exemplary components of the assembly in cross-section. FIG. 5A shows edge key fastener 20 which includes a bulging central portion, i.e. shaft 24. FIG. 5B shows an exemplary rib 16 in cross-section. Rib 16 includes cavity 58 having the same cross-sectional shape as edge key fastener 20. In the cross-sectional view, cavity 58 is an elongate opening with a bulbous central portion 60 and rib 14 includes bottom flange 62 that may be disposed along or facing rear side 4. FIG. 5C shows locking link 14 including opposed arms 64. Each of opposed arms 64 includes ridged surface 66 but other locking features may be utilized in other exemplary embodiments. Locking links 14 may take on other configurations other than the orthogonal embodiment illustrated, in other exemplary embodiments. Arms 64 including ridged surfaces 66 are received in corresponding cavities of side rails 12 and end rails 10. FIG. 5D shows end rail 10 including cavity 70 which receives an arm 64 of locking link 14. Groove 72 receives edges 6 of solar energy collecting panel 2 when the components are assembled. Side rail 12 is shown in FIG. 5E and includes cavity 76 that receives an arm 64 of locking link 14. Wall 40 of side rail 12 may include one or more discrete openings or a continuous longitudinal opening through which first flanges 22 of edge key fastener 20 are inserted and within which shaft 24 of edge key fastener 20 is disposed. Side rail 12 and cavity 76 are dimensioned such that opposed first flanges 22 of edge key fastener 20 are disposed within cavity 76, according to various exemplary embodiments.

End rail 10, side rail 12 and locking links 14 may be configured such that inner surfaces of cavities 70 and 76 may include ribbed features that mesh with ridged surfaces 66 of locking links 14 to securely position the components. Side rails 12 also include groove 78 for receiving edges 6 of solar energy collecting panel 2. With respect to end rails 10 and side rails 12, cavities 70, 76 may extend the length of their respective frame component or a shorter distance sufficient to tightly receive arms 64 to secure the components in place with respect to one another and with respect to solar energy connecting panel 2.

While the illustrated embodiments show one rib 16 adapted to be coupled to the frame and coupled transverse to the longer frame components, i.e. side rails 12, other exemplary embodiments include additional ribs 16 coupled to each of opposed side rails 12. They may be evenly spaced or alternatively placed. According to the embodiment in which strip 42 (see FIG. 3A) represents an opening or groove that extends lengthwise alongside rib 12, ribs 16 may be coupled to side rail 12 at any of a continuum of locations. More particularly, edge key fasteners 20 may be inserted through and secured to any of a continuum of locations along wall 40 of side rail 12. In still another exemplary embodiment, ribs may be coupled lengthwise to each of opposed end rails 10.

According to one aspect, a method is provided for assembling a solar energy collection module without using any screws. The method comprises providing a solar energy collecting panel having a collecting side and a back side, and forming a frame that surrounds and retains the solar energy collecting panel by attaching frame components to one another and to the solar energy collecting panel, by inserting locking links that extend into corresponding cavities of each of adjacent ones of the frame components, such that each the frame component secures an outer edge of the solar energy collecting panel. The method further comprises attaching a rib to at least two locations on the frame, by inserting a first flange of a fastener through a corresponding opening in a surface of the frame and rotating the fastener to position the flange behind the surface then inserting a second flange of the fastener into a corresponding rib receptacle at each location, the rib disposed along the back side.

According to another aspect, a method is provided for assembling a solar energy collection module without using any screws. The method comprises providing a solar energy collecting panel having a collecting side and a back side, providing a plurality of frame components that are combinable to form a frame that surrounds the solar energy collecting panel, and joining a fastener to each of opposed frame components of the plurality of frame components. Each fastener is joined by inserting a first flange of the fastener through a corresponding opening in an inwardly disposed wall of the frame component and rotating the fastener to position the first flange behind the wall and an opposed second flange in front of the wall. The method comprises assembling the frame by attaching frame components to one another and to the solar energy collecting panel using no screws, by inserting locking links into corresponding cavities of adjacent ones of the frame components such that each frame component secures an outer edge of the solar energy collecting panel, and by attaching a rib to each of the opposed frame components without using a screw, by inserting the second flanges into corresponding rib receptacles disposed at each of opposed ends of the rib.

According to yet another aspect, a solar energy collecting assembly comprises a solar energy collecting panel including a solar energy collecting face with photovoltaic cells and a rear face; a frame extending peripherally around the solar energy collecting panel and comprising a plurality of frame components fastened together without a screw, the frame components coupled to one another with a plurality of locking links that extend into each of adjacent ones of the frame components; a rib disposed along the rear face and coupled without a screw to the frame components disposed along opposed edges of the panels; and a fastener securing each of opposed ends of the rib to the frame. Each fastener comprises a shaft extending through an opening in a wall of the frame, a duality of first flanges coupled to the shaft and positioned behind the wall and a duality of second flanges coupled to the shaft, spaced from the duality of first flanges and received within a corresponding one of the opposed ends of the rib, wherein the solar energy collecting assembly includes no screws.

The preceding merely illustrates examples of the subject matter. It will thus be appreciated that those skilled in the art will be able to devise various arrangements which, although not explicitly described or shown herein, embody the principles of the disclosure and are included within its spirit and scope. Furthermore, all examples and conditional language recited herein are principally intended expressly to be only for pedagogical purposes and to aid in understanding the principles of the disclosure and the concepts contributed by the inventors to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

Although the disclosure has been described in terms of exemplary embodiments, it is not limited thereto. Rather, the appended claims should be construed broadly, to include other variants and embodiments of the disclosure, which may be made by those skilled in the art without departing from the scope and range of equivalents of the disclosure.

What is claimed is:

1. A solar energy collecting assembly comprising:
   a solar energy collecting panel including a solar energy collecting face with photovoltaic cells, and a rear face;
   a frame extending peripherally around said solar energy collecting panel and comprising a plurality of frame components fastened together, said frame components coupled to one another with only a plurality of locking links that extend into each of adjacent ones of said frame components;
   a rib disposed along said rear face and coupled to said frame components disposed along opposed edges of said panels; and
   a fastener securing each of opposed ends of said rib to said frame, each fastener comprising a shaft extending through an opening in a wall of said frame, a duality of first flanges coupled to said shaft and positioned behind said wall and a duality of second flanges coupled to said shaft, spaced from said duality of first flanges and received within a corresponding one of said opposed ends of said rib, wherein said opening has an elongate shape and a bulbous central portion and each of said duality of second flanges is received in a cavity, respectively, in said corresponding end of said rib.

2. The solar energy collecting assembly as in claim 1, wherein said opening extends longitudinally along a length of said frame component.

3. The solar energy collecting assembly as in claim 2, wherein said fastener includes the same cross-sectional shape as said opening but is rotated with respect to said opening.

4. The solar energy collecting assembly as in claim 1, wherein said fastener includes said shaft disposed between said duality of said first flanges, and said first flanges and said second flanges are substantially flat, have the same thickness and are substantially aligned with one another.

5. The solar energy collecting assembly as in claim 1, wherein said frame and said rib are formed of aluminum and said fasteners are formed of aluminum or a metal material being more noble than aluminum.

6. The solar energy collecting assembly as in claim 1, wherein a peripheral edge of said solar energy collecting panel is received in a corresponding groove of each of said plurality of frame components and said frame components comprise a set of opposed end rails and a set of opposed side rails being longer than said end rails, and said rib is attached to each of said side rails.

7. The solar energy collecting assembly as in claim 6, further comprising a further rib joined to each of said side rails using a further duality of said fasteners and no screws.

8. The solar energy collecting assembly as in claim 1, wherein said fastener includes said duality of first flanges having said shaft interposed therebetween, said first flanges being substantially flat, having a first thickness and being substantially aligned with one another, said shaft having a greater thickness than said first thickness and said rib having a central cavity defined by a cross-sectional shape being substantially the same as a cross-sectional shape of said fastener.

9. The solar energy collecting assembly as in claim 1, wherein said rib is coupled to said frame components with only said fasteners.

10. The solar energy collecting assembly as in claim 1, wherein said rib is coupled to said frame components without any screws.

11. The solar energy collecting assembly as in claim 1, wherein said duality of first flanges are aligned with one another and are each substantially flat.

12. The solar energy collecting assembly as in claim 11, wherein said second flanges are substantially flat, include said shaft therebetween, have the same thickness and are substantially aligned with one another.

13. The solar energy collecting assembly as in claim 1, wherein said wall of said frame is a wall that faces said solar energy collecting panel.

14. A solar energy collecting assembly comprising:
a solar energy collecting panel including a solar energy collecting face with photovoltaic cells, and a rear face;
a frame extending peripherally around said solar energy collecting panel and comprising a plurality of frame components fastened together, said frame components coupled to one another with only a plurality of locking links that extend into each of adjacent ones of said frame components;
a rib disposed along said rear face and coupled to said frame components disposed along opposed edges of said panels; and
a fastener securing each of opposed ends of said rib to said frame, each fastener comprising a shaft extending through an opening in an inwardly facing wall of said frame, at least one first flange coupled to said shaft and positioned behind said inwardly facing wall and at least one second flange coupled to said shaft, spaced from said at least one first flange and received within a corresponding one of said opposed ends of said rib, wherein said opening has an elongate shape and a bulbous central portion and each of said at least one first flanges and at least one second flanges is received in a cavity, respectively, in said corresponding end of said rib.

15. The solar energy collecting assembly as in claim 14, wherein said at least one first flange comprises a plurality of said first flanges disposed on opposed sides of said shaft and aligned with one another.

16. The solar energy collecting assembly as in claim 15, wherein said at least one second flange comprises a plurality of said second flanges on opposed sides of said shaft.

17. The solar energy collecting assembly as in claim 16, wherein said plurality of first flanges have a first flange length along a direction of said shaft and said plurality of second flanges have a second flange length along a direction of said shaft and said first flange length is different than said second flange length.

18. The solar energy collecting assembly as in claim 14, wherein said rib is secured to said frame components without any screws.

19. The solar energy collecting assembly as in claim 14, wherein said rib is secured to said frame components with only said fasteners.

* * * * *